United States Patent [19]
Bauer

[11] Patent Number: 5,947,506
[45] Date of Patent: Sep. 7, 1999

[54] TRAILER HITCH BUMPER GUARD

[76] Inventor: Martin George Bauer, 3039 State St., Bismarck, N. Dak. 58501

[21] Appl. No.: 08/822,815

[22] Filed: Mar. 24, 1997

[51] Int. Cl.[6] .................................................. B60D 1/60
[52] U.S. Cl. ............................................... 280/507
[58] Field of Search .................. 280/477, 507, 280/504, 511, 512; 70/14, 58

[56] References Cited

U.S. PATENT DOCUMENTS

| | | | |
|---|---|---|---|
| 3,605,457 | 9/1971 | Foster | 280/507 |
| 4,032,171 | 6/1977 | Allen et al. | 280/507 |
| 4,141,569 | 2/1979 | Dilk | 280/507 |
| 4,208,065 | 6/1980 | Hansen | 280/507 |
| 4,459,832 | 7/1984 | Avrea et al. | 280/507 |
| 4,577,884 | 3/1986 | Harris | 280/507 |
| 4,836,570 | 6/1989 | Lopez et al. | 280/507 |
| 4,861,062 | 8/1989 | Stidsen | 280/507 |
| 4,940,371 | 7/1990 | Cholovich | 410/101 |
| 4,989,892 | 2/1991 | Kerins et al. | 280/504 |
| 5,421,601 | 6/1995 | Hinze et al. | 280/507 |
| 5,584,495 | 12/1996 | Mason | 280/507 |
| 5,700,024 | 12/1997 | Upchurch | 280/507 |
| 5,775,139 | 7/1998 | Sellers | 280/507 |

*Primary Examiner*—Kevin Hurley
*Attorney, Agent, or Firm*—Curtis V. Harr

[57] ABSTRACT

A trailer hitch bumper guard that is formed from three-sided box-like apparatus mounted to the rear bumper of the towing vehicle with a fourth, open side of the apparatus which faces outward from the rear of the towing vehicle. The bottom of the box has a round hole, through which the ball of a trailer hitch may be attached. The three closed sides of the box provide protection from dents and scratches to the rear bumper of the towing vehicle if the trailer's receiver apparatus passes the ball and comes into contact with the rear portion of the bumper. A hinged cover is attached to the rearmost side of the box, and pivots upward to allow greater access to the ball hitch. During attachment, the hinged cover is placed in the open position and thus, extends the amount of protection supplied to the vehicle by the present invention. When in the lowered position, the hinged cover creates a step on which the driver can stand to gain easy access to the rear portion of the towing vehicle. The closed cover can also be secured with a padlock to provide protection from theft and unauthorized tampering with the hitch.

10 Claims, 6 Drawing Sheets

TRAILER HITCH BUMPER GUARD

BACKGROUND OF THE INVENTION

The present invention relates to an improvement in a means of protecting the rear bumper of vehicles used in towing utility trailers, boats, campers and other apparatus employing a ball hitch type connection. More specifically, a method by which the area of the rear bumper immediately adjacent to the ball hitch is protected from dents and scratches when the towing vehicle is being moved backwards and aligned with the trailer for attachment.

The ball hitch mechanism consists of a round ball which is mounted to the back end of the towing vehicle, and a concave, ball-shaped receiver apparatus which is mounted to the trailer. The concave receiver apparatus fits over the ball mounted on the towing vehicle and is locked into place by means of a clamp portion contained within the receiver apparatus.

In order to effectuate the hitch configuration, the back of the towing vehicle and front of the trailer must be brought together in close proximity. This is usually accomplished by backing the towing vehicle up to within a few inches of the front of the trailer and moving the trailer hitch into an aligned and attached position on the vehicle. This task can be very difficult especially when the hitch portion is unmovable due to the weight of the trailer such as in campers and large boats. This problem may also be present with smaller trailers especially when the person making the attachment lacks the physical strength to move the hitch.

In the past, the process of backing up a towing vehicle to the front of a trailer could result in damage to the rear bumper of the towing vehicle while jockeying the vehicle about. Even with the use of side mirrors, the driver of the towing vehicle often finds it very difficult to see how close the two surfaces are to each other. If the driver backs up too far and too quickly, the forward most surface of the trailer's tongue apparatus can come in contact with the rear bumper of the towing vehicle, causing dents or scratches. The driver is usually required to get out of the vehicle several times to check the proximity of the towing vehicle and trailer, which is time consuming and frustrating.

Even when the driver has an assistant, the result is often the same. Signals between the assistant and the driver can be misconstrued or unheard, causing the driver to hit the front of the trailer tongue with the rear portion of his vehicle. Thus, even when the driver is being helped by a second person, these occasional collisions between the towing vehicle and the trailer are inevitable.

From the foregoing discussion, it can be clearly seen that a device for preventing damage to the rear bumper of the towing vehicle when it comes into contact with the front of a trailer's receiver apparatus is highly desirable. Further, it is desirable to provide such a device that will simplify the process of attaching a trailer to a towing vehicle. It is also highly desirable to provide a device, as above, which can be used by a driver to elevate ones self above the trailer apparatus, such as a rear step. This step would also allow a user access to the rear portion of the towing vehicle. Finally, it would be desirable to provide such a device with a means of safely and securely locking a vehicle to a trailer at the hitch area.

SUMMARY OF THE INVENTION

It is the primary objective of the present invention to provide a means of protecting the rear bumper of a towing vehicle from damage caused by contact with the receiver apparatus of a trailer during attachment of the trailer.

It is an additional objective of the present invention to provide a means by which a driver, acting alone, can maneuver a towing vehicle backward towards a trailer for attachment without fear of causing damage to the rear bumper of the vehicle.

It is a further objective of the present invention to provide a means for the user to gain easy access to the back of the towing vehicle or front portion of a trailer, such as a boat.

A still further objective of the present invention is to provide a device that can be locked during towing of a trailer so as to prevent the unauthorized detachment of the trailer from the towing vehicle both for safety and security.

These objectives are accomplished by the use of a three-sided box-like apparatus mounted to the rear bumper of the towing vehicle. The fourth, open side of the apparatus faces outward from the rear of the towing vehicle. The bottom of the box has a hole through which the ball of the trailer hitch protrudes. The three closed sides of the box provide protection from dents and scratches to the rear bumper of the towing vehicle if the trailer's receiver apparatus passes the ball and comes into contact with the rear portion of the bumper.

A hinged cover is attached to the rearmost side of the box, and pivots upward to allow greater access to the ball hitch. During attachment, the hinged cover is placed in the open position and thus extends the amount of protection supplied to the vehicle by the present invention. When in the lowered position, the hinged cover creates a step on which the driver can stand to gain easy access to the rear portion of the towing vehicle. The closed cover can also be secured with a padlock or other suitable locking device in order to provide protection from theft and unauthorized tampering with the hitch.

For a better understanding of the present invention reference should be made to the drawings and the description in which there are illustrated and described preferred embodiments of the present invention.

DESCRIPTION OF THE PREFERRED EMBODIMENT

Figure 1:
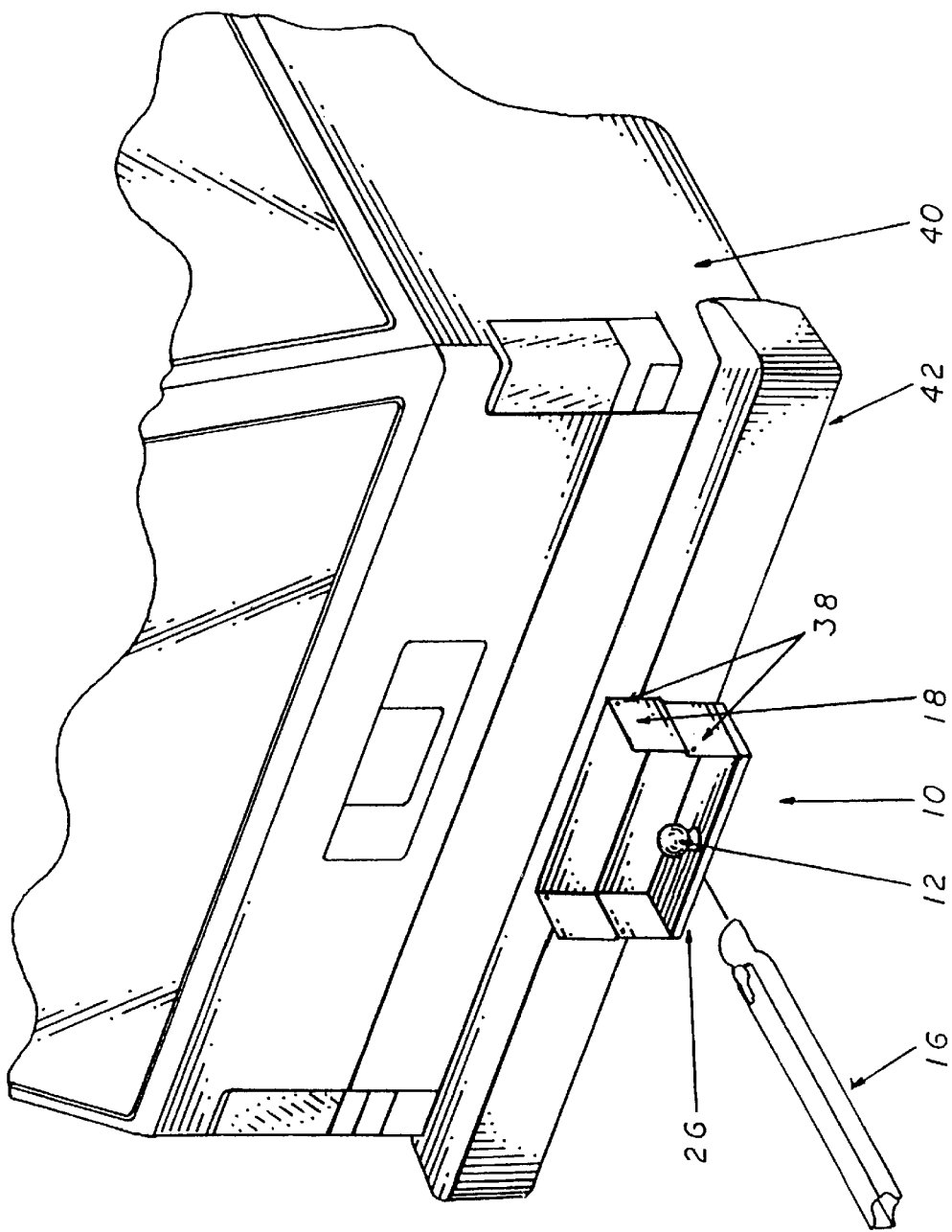
FIG. 1 is a perspective elevation view of the trailer hitch bumper guard in the open position, showing its major components and its orientation in relation to the towing vehicle and the trailer tongue during the trailer attachment process.
Figure 2:
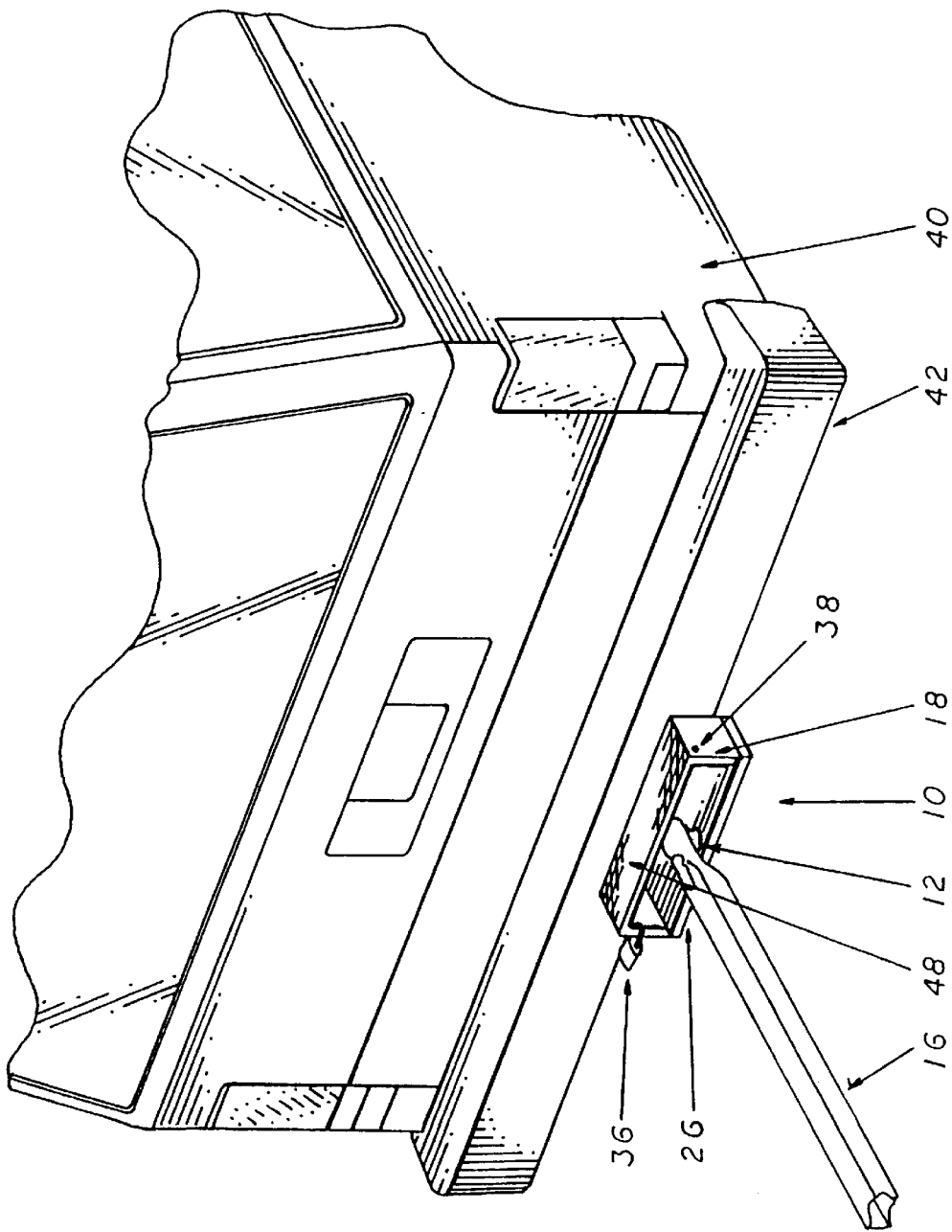
FIG. 2 is a perspective elevation view of the trailer hitch bumper guard in the closed position, showing its major components and its orientation in relation to the towing vehicle and the trailer tongue in the attached position.
Figure 3:
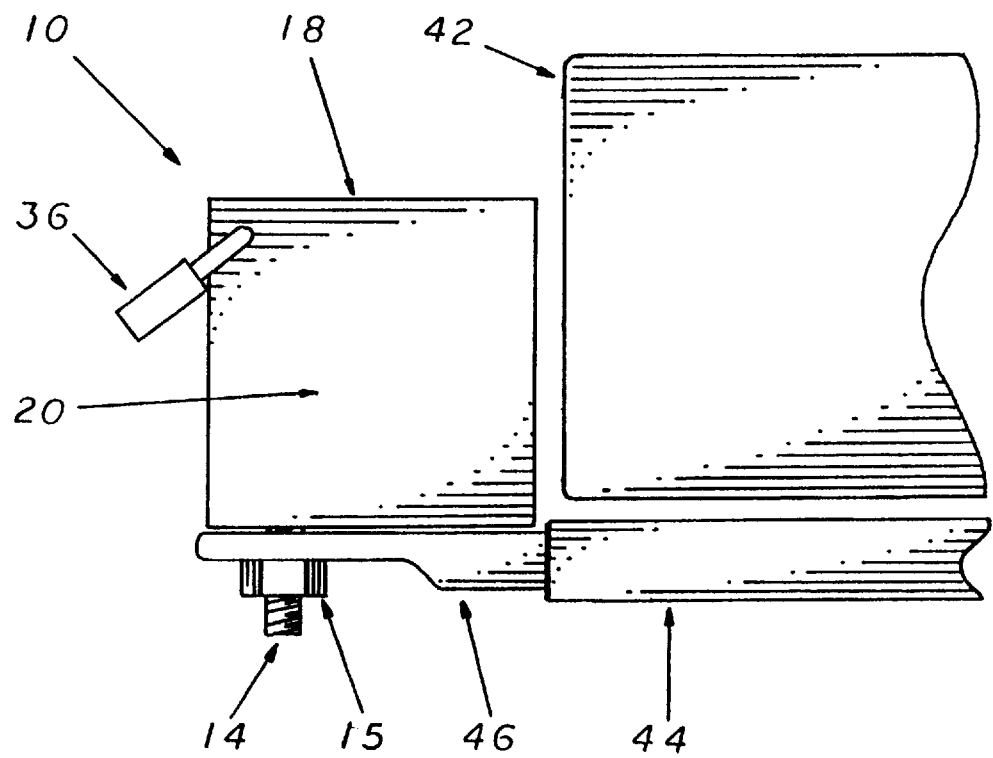
FIG. 3 is a side elevation view of the present invention showing its orientation in relation to the towing vehicle bumper and the receiver hitch.

Referring now to the drawings, and more specifically to FIGS. 1, 2, 3, and 4, the trailer hitch bumper guard 10 comprises a box-like apparatus that mounts directly behind the bumper 42 of a towing vehicle 40 on the receiver tongue 46 commonly used with a receiver type hitch 44 or directly to the bumper 42. The trailer ball 12 that is normally connected via a attachment bolt 14 and nut 15 is then contained within the inner cavity of the trailer hitch bumper guard 10. The trailer tongue 16 then engages the trailer ball 12 within the present invention, thereby protecting the rear bumper 42 from scratches and dents commonly caused by normal trailer ball engagement process. FIG. 1 depicts the trailer hitch bumper guard 10 in a open state as would be used during the attachment of a trailer tongue 16 to a towing vehicle 40. FIG. 2 depicts the trailer hitch bumper guard 10 in a closed and locked state as would be used during the towing of a trailer via a trailer tongue 16.

Referring again to drawings 1, 2, 3, and 4 the box of the trailer hitch bumper guard 10 is made up of primarily a lower protection case 26 and a pivoting upper protection case 18. The pivoting upper protection case 18 itself is comprised of two, upper protection case side walls 20 which form its outside, vertical walls, and a upper protection case upper surface plate 22 which forms the upper portion of the trailer hitch bumper guard 10. The upper protection case upper surface plate 22 also has on its upper facing surface a non-slip step surface 48. This feature allows the present invention to be used as a step, thereby giving easier access to the rear of the towing vehicle 40.

The lower protection case 26 is comprised of a lower protection case lower surface plate 32, a lower protection case back wall 30, and lower protection case side walls 28. These features provide the structural basis by which the present invention protects the rear bumper 42 of the towing vehicle 40. Additionally, the pivoting upper protection case 18 and the lower protection case 26 are equipped with security padlock holes 38 at the corresponding upper, outside corners of the upper and lower protection case side walls, 20 and 28. These provide the means by which the security padlock 36 may be engaged to secure the pivoting upper protection case 18 may be locked to the lower protection case 26.

The trailer hitch bumper guard 19 is attached to the towing vehicle 40 through the typical receiver hitch 44. The present invention is equipped with a trailer ball attachment hole 34 which is located in the lower protection case floor 32. The trailer hitch 12 mounts above this feature and the trailer ball attachment bolt 14 passes through the lower protection case floor 32 and then through the receiver tongue 46. The trailer ball 12 is then secured to the receiver tongue 46 in the typical fashion with the use of the nut 15.

Figure 4:
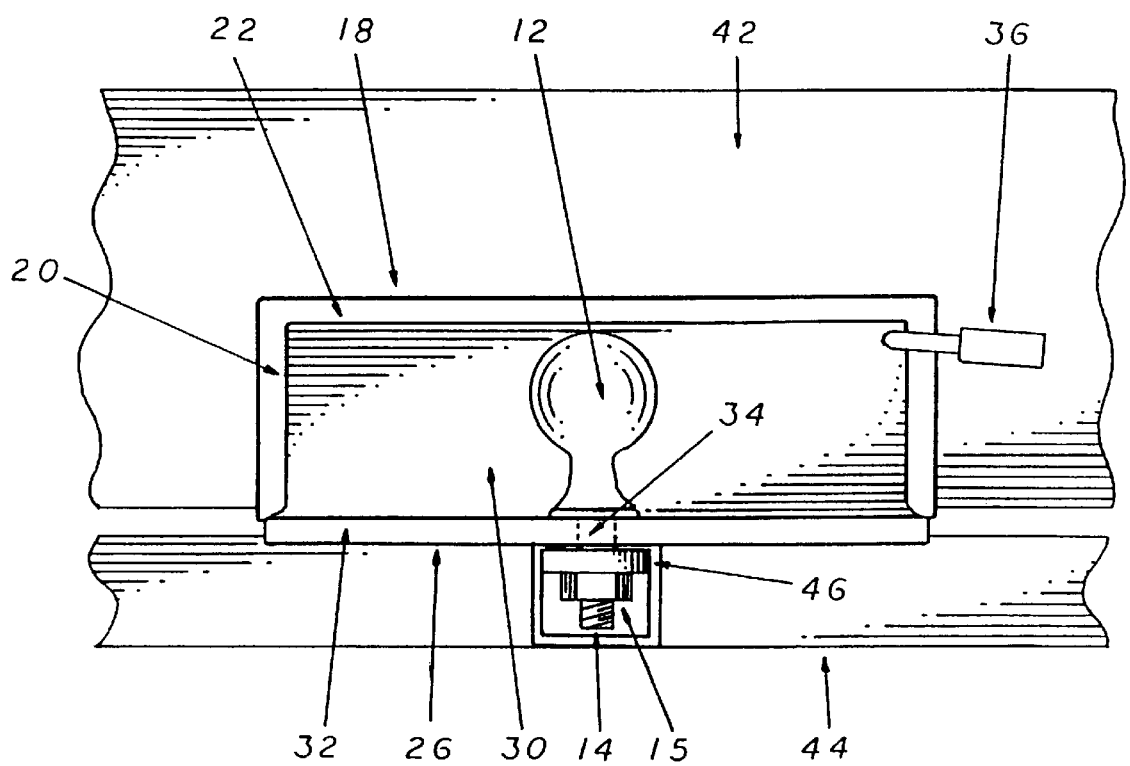
FIG. 4 is a front elevation view of the present invention showing the orientation of its major components and its position in relation to the towing vehicle bumper.
Figure 5:
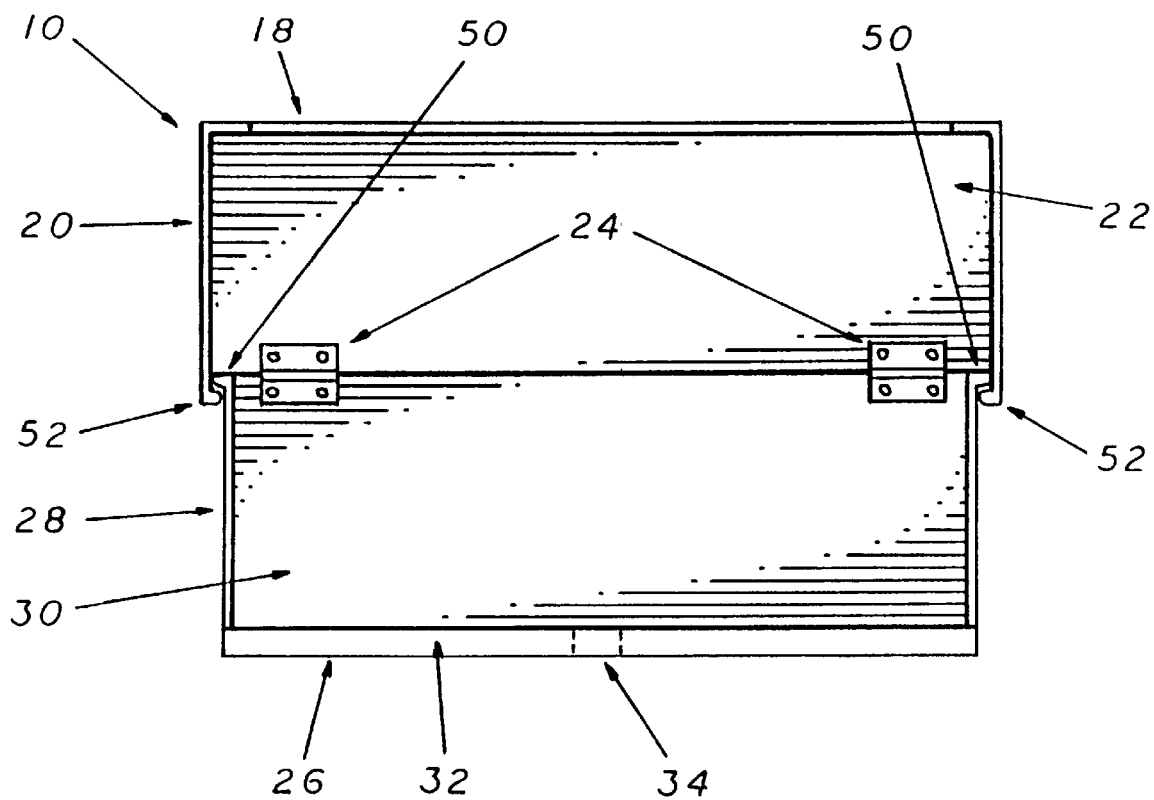
FIG. 5 is a front elevation view of the present invention showing the manner in which the upper protection case pivots upward to allow access to the interior and the trailer ball contained therein.
Figure 6:
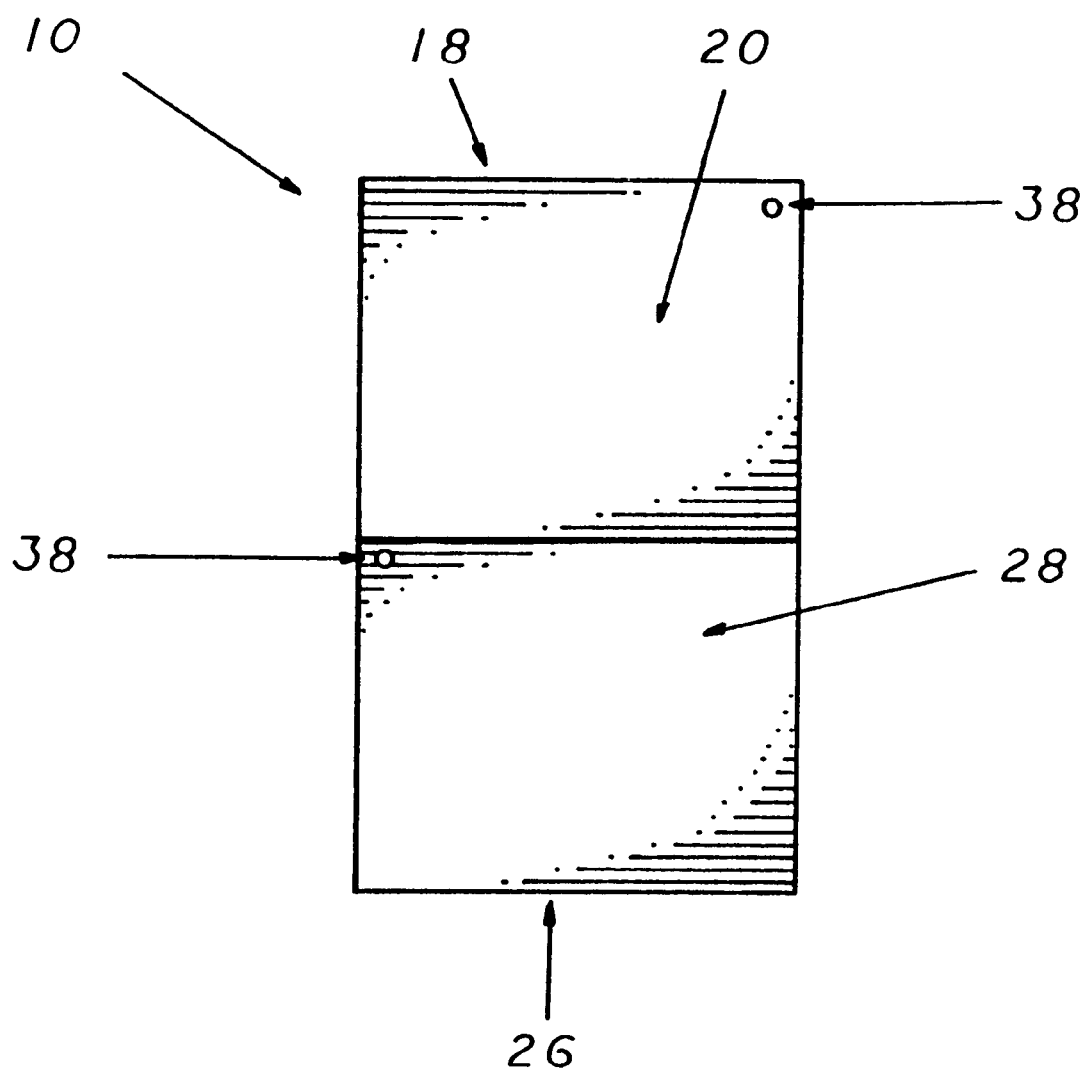
FIG. 6 is a side elevation view of the present invention showing the upper protection case in the raised position.

FIGS. 4 and 5 illustrate the use and purpose of the pivoting upper protection case 18 on the trailer hitch bumper guard 10. The pivoting upper protection case 18 is connected to the lower protection case 26 by use of the pivoting upper protection case hinges 24 along the upper surface of the lower protection case back wall 30 and along the rear surface of the upper protection case upper surface plate 22. This feature allows the pivoting upper protection case 18 to upwardly pivot along these attachment points so that it can be moved out of the way during trailer attachment. The extent of travel of the pivoting upper protection case 18 is limited by the use of the base pivot stops 50 and the upper pivot stops 52. The base pivot stops 50 are outwardly extending lips located on the upper surface of the lower protection case side walls 28. The upper pivot stops 52 are inwardly extending lips that are located on the lower surface of the pivoting upper protection case side walls 20. These two features engage when the pivoting upper protection case 18 is fully opened separating the security padlock holes 38, thereby ensuring that it will not open beyond the desired point.

Although the present invention has been described in considerable detail with reference to certain preferred versions thereof, other versions are possible. Therefore, the spirit and scope of the appended claims should not be limited to the description of the preferred versions contained herein.

What is claimed is:

1. A trailer hitch bumper guard connected to the rear hitch portion of a towing vehicle comprising:

a lower case having a lower surface plate having a first and second outer edge, a back edge, a front edge, a top face and a bottom face, a first and second lower side wall each having a lower and upper portion with said side walls extending perpendicular from said first and second outer edge respectively of said lower surface plate a back wall having a lower and upper portion, said back wall extending upward and perpendicular from said back edge of said lower surface plate;

an upper case having an upper surface plate of a slightly different length than said lower surface plate said upper surface plate having a first and second outer edge, a back edge, a front edge, a top face and a bottom face;

a first and second upper side wall each having a lower and upper portion with said side walls extending perpendicular downward from said first and second outer edge respectively of said upper surface plate; and a pivotal attachment means for pivotally connecting said lower case means to said upper case means.

2. A trailer hitch bumper guard as in claim 1 wherein said pivotal attachment means comprises:

a hinge portion connecting said lower case at said back wall about said upper portion to said upper case at said upper surface plates back edge so as to allow said upper and lower case means to pivotally open and form a flat open portion while open to protect the rear of the vehicle during hitching;

and to pivotally close forming a box like portion having a open rear section with said upper case means preventing said trailer from being detached from said vehicle while said upper case means is in said closed position; and a limiting means for limiting the extent of said hinge portion to pivotally open.

3. A trailer hitch bumper guard as in claim 2 further comprising a means for locking said trailer hitch bumper guard in a closed position.

4. A trailer hitch bumper guard as in claim 3 wherein said means for locking said trailer hitch bumper guard is a padlock and a means for joining said lower case means and upper case means in a closed position with said padlock.

5. A trailer hitch bumper guard connected to the rear hitch portion of a towing vehicle comprising:

a lower case a lower surface plate having a first and second outer edge, a back edge, a front edge, a top face and a bottom face;

a first and second lower side wall each having a lower and upper portion with said side walls extending perpendicular from said first and second outer edge respectively of said lower surface plate; and a back wall having a lower and upper portion, said back wall extending upward and perpendicular from said back edge of said lower surface Plate;

an upper case having an upper surface plate of a slightly different length than said lower surface plate said upper surface plate having a first and second outer edge, a back edge, a front edge, a top face and a bottom face;

a first and second upper side wall each having a lower and upper portion with said side walls extending perpendicular downward from said first and second outer edge respectively of said upper surface plate;

a pivotal attachment means for pivotally connecting said lower case means to said upper case means; and a means for locking said trailer hitch bumper guard in a closed position.

6. A trailer hitch bumper guard as in claim 5 wherein said means for locking said trailer hitch bumper guard is a padlock and a means for joining said lower case means and upper case means in a closed position with said padlock.

7. A trailer hitch bumper guard as in claim 5 wherein said pivotal attachment means comprises:

a hinge portion connecting said lower case at said back wall about said upper portion to said upper case at said upper surface plates back edge so as to allow said upper and lower case means to pivotally open and form a flat open portion while open to protect the rear of the vehicle during hitching;

and to pivotally close forming a box like portion having a open rear section with said upper case means preventing said trailer from being detached from said vehicle while said upper case means is in said closed position; and a limiting means for limiting the extent of said hinge portion to pivotally open.

8. A method for protecting a vehicle's rear portion while attaching said vehicle to a trailer and further of locking said trailer to said vehicle comprising the steps of:

providing a clamshell type case with an upper clamshell section, a lower clamshell section and an open rear portion;

mounting said lower section of said clamshell to the rear of said vehicle;

providing said clamshell with a stop such that the upper section cannot open far enough to come in contact with the rear of said vehicle;

opening said clamshell type case so as to form a surface to protect the rear of said vehicle;

backing said vehicle towards said trailer until said clamshell type case comes in contact with the hitch of said trailer;

attaching said trailer hitch to the vehicle hitch; and closing said clamshell type case so as to cover said trailer hitch.

9. A method of protecting a vehicle rear portion and locking a trailer to said vehicle as in claim 8 further comprising the additional step of providing said clamshell type case with a means of locking said case in a closed position.

10. A method of protecting a vehicle rear portion and locking a trailer to said vehicle as in claim 9 further comprising the addition step of locking said clamshell type case in a closed position with said locking means.

* * * * *